United States Patent

[11] 3,615,167

| [72] | Inventors | Jean Berthoux<br>Decines;<br>Jean Philippe, Caluire, both of France |
|---|---|---|
| [21] | Appl. No. | 830,858 |
| [22] | Filed | June 5, 1969 |
| [45] | Patented | Oct. 26, 1971 |
| [73] | Assignee | Progill<br>Paris, France |
| [32] | Priority | June 11, 1968 |
| [33] | | France |
| [31] | | 50092 |

[54] PROCESS OF VANADIUM RECOVERY FROM AN ORGANIC MEDIUM
8 Claims, No Drawings

[52] U.S. Cl....................................................... 23/19 V,
23/22, 23/23, 23/24, 23/51, 23/140, 260/348
[51] Int. Cl......................................................... C22b 59/00
[50] Field of Search............................................ 23/19.1,
18-20, 22-24, 51

[56] References Cited
UNITED STATES PATENTS

| 1,945,611 | 2/1934 | Knight et al. | 23/18 X |
| 2,587,286 | 2/1952 | Brundin | 23/19 X |
| 3,063,795 | 11/1962 | Smith | 23/51 |
| 3,063,796 | 11/1962 | Kelmers | 23/51 |
| 3,106,450 | 10/1963 | Berg | 23/19 X |

*Primary Examiner*—Herbert T. Carter
*Attorney*—Browdy and Neimark

ABSTRACT: Vanadium is recovered from residues of reaction masses obtained by oxidation of organic compounds in the presence of vanadium catalysts by treating with a strong mineral acid, adding a solvent for the organic products to separate off an aqueous layer containing the vanadium, bringing the pH to 5–7, adding an oxidation agent such as sodium hypochlorite and then adding an ammonium salt to precipitate ammonium metavanadate.

PROCESS OF VANADIUM RECOVERY FROM AN ORGANIC MEDIUM

The present invention relates to a process for the recovery of vanadium from an organic medium and more particularly to the recovery of vanadium from distillation residues of reaction masses obtained by the oxidation of organic compounds in the presence of vanadium catalysts. This method permits the recovery of the vanadium in a form which is easily transformed into a catalytic compound.

It is known that vanadium derivatives are often used as catalysts in reactions involving organic products, such as oxidation reactions. When such a reaction is carried out in the liquid phase, the reaction is generally vaporized or distilled in one or more stages at the end of the oxidation. A residue remains formed of the heavy organic byproducts, which contains the catalyst. This residue may be recycled as is to the oxidation reaction to replenish the catalyst. However, in the course of time as the recycling continues, the reaction mixture becomes excessively rich in heavy byproducts. Further it is possible that some the catalyst becomes deactivated little by little. For this reason, it is desirable to withdraw a portion or all of the residue and to introduce fresh catalyst. Thus, is is advantageous to treat the withdrawn mixture so as to recover the vanadium.

Accordingly, it is an object of the present invention to provide a process for recovering the vanadium from such organic mixtures and which process has the advantage of not degrading the recoverable organic products.

A particular type of oxidation reaction referred to above is the epoxidizing of the compounds having ethylenic unsaturation utilizing various oxidizing agents such as organic peroxides. For these purposes, many vanadium catalysts have been recommended, such as alkyl vanadates which have proven themselves as being quite satisfactory.

Thus, a further object of the invention relates to the recovery of the vanadium contained in distillation and vaporization residues of a reaction mass obtained by the epoxidation of a compound having an ethylenic unsaturation, and the use of the recovered vanadium for the regeneration of alkyl vanadates having catalytic activity.

In its most general form, the process of the present invention includes the following steps:

a. Treating the initial medium containing vanadium with an aqueous solution of a strong mineral acid to solubilize the vanadium, b. adding a water-immiscible solvent of the organic products present in the medium to induce a separation of the whole mixture into an aqueous phase containing the vanadium and an organic phase, c. after separation of the two layers adding a base to the aqueous phase recovered therefrom to yield a pH of between 5 and 7, d. subjecting the aqueous phase to the action of an oxidizing agent to transform the vanadium present at lower valency into the pentavalent state; and e. finally precipitating vanadium, preferably in the form of ammonium metavanadate by the introduction of an ammonium salt in an aqueous solution.

In the initial mixture the vanadium may be present in various degrees of valency. In the first step a strong inorganic acid is used such as hydrochloric, sulfuric and nitric acids. These acids combine with the vanadium present in its different valencies to give water-soluble salts. The acid concentration of the aqueous solution is an important factor. It is known that $V^{5+}$ solubility increases with acid concentration.

In a general way, solutions titrating at least 2 percent, and preferably 5–10 percent of acid must be used. There is no really critical upperlimit, but for economic reasons, the upper limit may be about 20 percent. The quantity of aqueous acid solution used depends upon the acid titration of the solution and upon the vanadium quantity. Quantities of between 20 and 200 parts by weight per part of the vanadium to be recovered are used in most cases. The treatment is conducted preferably with stirring and at room temperature or slightly lower, for example, between 15° and 25° C. It is better to avoid higher temperatures since they risk the possible increase in organic compounds, dissolving in water and to cause the vanadium initially present in the pentavalent state to pass to a lower oxidation degree.

The second operative step of the present process according to the invention consists in inducing separation of the mixture into an organic phase and an aqueous phase containing the vanadium. For this, a solvent of the organic products is added to the system. This solvent must be chosen among water-immiscible compounds; moreover, it must not extract vanadium, and must be inert in the presence of diluted mineral acids under operating conditions. Taking these preliminaries into account, the compound may be chosen from among the solvents usual in organic synthesis. As convenient compounds it is possible to quote, in a nonlimitative way, aliphatic or aromatic hydrocarbons, which may be chlorinated, such as hexane, benzene, monochlorobenzene, toluene, xylene isopropylbenzene, etc. Solvent quantity to use may vary in large limits and may range, for example, between 5 and 40 percent by weight with regard to the initial medium to be treated. The separation speed increases with the solvent quantity used, so, the solvent may be chosen with regard to the desired speed.

According to a variation, the two operative steps described above may be achieved simultaneously by introducing into the initial medium both the aqueous solution and the solvent. Moreover it is possible to dilute the initial medium first by the organic solvent, and then to achieve the acid treatment.

When the separation into layers is ended, the lower aqueous layer is separated from the supernatent organic layer. The organic layer may be treated to recover its constitutive compounds and the solvent used for decantation. For example, it is first neutralized by a basic substance, and then submitted to a distillation step.

The aqueous layer containing the vanadium is brought to a pH of between 5 and 7 means of a basic substance such as calcium potassium, or sodium hydroxide. The adjustment of the aqueous solution to a pH between the indicated values is one of the critical factors of the process according to the invention, as it permits the vanadium compounds oxidation to be achieved under the best conditions; that is, to obtain a total conversion of vanadium to its upper valency degree with a minimal consumption of the oxidizing agent. Another important factor of this oxidation step is represented by temperature. This must, preferably, not exceed 25° C. A higher temperature is generally harmful for vanadium oxidation, as it favors, to the prejudice of this reaction, the oxidation of the organic products dissolved in the aqueous solution. If the recommended pH and temperature conditions are taken into account, it is not necessary to use especially strong oxidizing agents. Though is is not excluded to use oxidizing agents such as alkali metal permanganates and persulfates—the latter in the presence of silver ions,—hydrogen peroxide, etc., very good results are obtained by using less strong oxidizing agents having a less expensive cost such as sodium hypochlorite especially under the form of Javelle water. The oxidizing agent is introduced preferably slowly into the aqueous solution in a quantity sufficient for oxidizing all the vanadium present in the medium into the pentavalent form. It is possible to see that oxidation is completed when the mixture takes on an orange-yellow color, which is characteristic of the presence of valadium only in the pentavalent form.

According to the last step of the process according to the present invention, vanadium is precipitated from the oxidizing solution, preferably in ammonium metavanadate form. For this, an ammonium salt, such as the chloride, sulfate, nitrate, etc., is added to this solution. It is advantageous to operate with an excess of ammonium salt with regard to stoichiometry, as metavanadate solubility varies in inverse ratio to the quantity of ammonium ions present in aqueous solutions. To favor metavanadate precipitation, it is recommended that the mixture be stirred and to operate at a temperature not exceeding, generally, 20° to 25° C. Of course, if the further utilization of the recovered vanadium requires it, it is also possible to precipitate the metal in other forms, for example as vanadium pentoxide. Vanadium precipitation as ammonium metavanadate constitutes a preferred but nonexclusive form of the process according to the invention.

The metavanadate precipitate is then separated from the mother-liquor, for example, by filtration or centrifugation. Mother-liquors may be recycled partially to the precipitation or even to the acid treatment stage after convenient readjusting of the titration in mineral acid. It is also possible to regenerate the ammonium salt useful at the precipitation stage, from a part or the whole of mother-liquors by classical methods, such as mother-liquors treatment by a metal hydroxide, followed by absorption in water of the formed ammoniac and neutralization by the convenient mineral acid.

The filter cake may be contaminated by a small quantity of mineral salts formed during the process by reaction of the acids and bases used. It is easily freed from those impurities, for example by washing with an aqueous solution of ammonium chloride and/or with ordinary water. Washing waters are recyclable to the precipitation stage. Ammonium metavanadate, which may possibly be dried is then ready to use.

The process according to the present invention uses elementary reactions which may be readily conducted in usual equipment. It gives excellent results generally permitting recovery of 95 to 100 percent of the vanadium initially present. Moreover the metavanadate obtained in that way is practically pure.

This product is advantageously used to make alkyl vanadates which are especially efficient as catalysts for epoxidizing in liquid phase ethylenic nonsaturated compounds by organic peroxides; those vanadic esters may be prepared, for example, according to a known method consisting of heating under reflux ammonium metavanadate and the desired alcohol in excess. (F. Cartan et al. Journal of Physical Chemistry 64 p. 1756 (1960). Thus the vanadium recovery process according to the invention may be used for a continuous fabrication of glycidol (or : 2,3-epoxy-1 propanol), utilizing an alkyl vanadate as a catalyst. Due to the operations of vanadate recycling and regeneration, this process suppresses catalyst losses.

The example hereinafter given in an illustrative way shows how the present invention may be used.

EXAMPLE 8,350 g. of a residue is treated having 2.60 percent by weight of vanadium, obtained by vaporization of a reaction mass of allyl alcohol epoxidation by isopropyl-benzene hydroperoxide, in the presence of $n$-propyl vandate as a catalyst. This residue contains, as organic products 62.5 percent by weight of dimethylpenylcarbinol, 3.1 percent of isopropylbenzene, 2.2 percent of glycidol as well as various heavy byproducts.

15,950 g. of an aqueous solution of hydrochloric acid containing 5 percent of HC1 are added to this mass. The mixture at the temperature of 20° C. is stirred for one-half hour, then 2,700 g. of isopropylbenzene are added while maintaining stirring. Then the mass is introduced into a decanter and 16,860 g. of aqueous phase are withdrawn after 45 minutes.

The organic phase, having a weight of 10, 140 g. is neutralized by adding 100 g. of sodium bicarbonate, and is then submitted to a distillation which yields the recovery of isopropylbenzene and dimethylphenylcarbinol.

2,010 g. of 45 percent sodium hydroxide aqueous solution are added to the aqueous phase. The mixture attains a pH of 6. Thereafter 1,550 ml. of Javelle water having a chlorometric degree of 36 are introduced slowly. During this operation the mass temperature is maintained at 20° C. At the end of the oxidizing agent addition the mixture presents an orange-yellow coloration. 6,720 g. of 25 percent ammonium chloride aqueous solution is then introduced into the medium with mild stirring. After stirring for about 1 hour, the mass is filtrated, and the filter cake washed with an aqueous solution of 10 percent ammonium chloride, then with ordinary water. After cake drying 490 g. of ammonium metavanadate are obtained, titrating 43.5 percent of vanadium.

In operating under the same conditions as above and with the same reagent quantities, except that the 2,700 g. of isopropylbenzene are introduced simultaneously with HC1 aqueous solution, identical results are obtained.

Ammonium metavanadate obtained in this way is treated while hot with an excess of n-propanol in order to obtain an alcoholic solution of n-propyl vanadate, which solution is used as is for the continuous fabrication of glycidol by allyl alcohol epoxidation using isopropylbenzene hydroperoxide as an oxidizing agent.

What is claimed is:

1. A process for recovering vanadium contained in an organic medium which is a distillation or vaporization residue of a reaction mass obtained by oxidizing an organic compound in liquid phase in the presence of vanadium catalysts comprising: adding to said vanadium containing organic medium an aqueous solution of a strong inorganic mineral acid titrating at least 2 percent to solubilize vanadium values; adding a water immiscible solvent of the organic products which does not extract vanadium and is inert in the presence of diluted mineral acids under operating conditions, whereby the whole mixture separates into an organic layer and an aqueous layer containing the vanadium to between 5 and 7 by adding a base; oxidizing vanadium to the pentavalent state by adding on oxidizing agent at a temperature not exceeding 25° C; and then adding an ammonium salt to precipitate the vanadium as ammonium metavanadate.

2. A process according to claim 1 wherein said aqueous solution of strong mineral acids titrates no greater than 20 percent of acid and acid addition is achieved at a temperature not exceeding 25° C.

3. A process according to claim 1 wherein said aqueous solution of strong mineral acid is hydrochloric, sulfuric or nitric acid and titrates 5 to 10 percent of acid.

4. A process according to claim 1 wherein said solvent is selected from the group consisting of aliphatic, aromatic, chlorinated aliphatic and chlorinated aromatic hydrocarbons.

5. A process according to claim 1 wherein said oxidizing agent is sodium hypochlorite.

6. A process according to claim 1 wherein the initial organic medium is obtained by epoxidizing an ethylenic unsaturated compound in liquid phase in the presence of vanadium catalysts.

7. A process according to claim 6 wherein the vanadium catalysts are alkyl vanadates.

8. A process according to claim 8 wherein said ethylenic unsaturated compound is allyl alcohol.

* * * * *

UNITED STATES PATENT OFFICE
CERTIFICATE OF CORRECTION

Patent No. 3,615,167    Dated October 26, 1971

Inventor(s) Jean Berthoux et al.

It is certified that error appears in the above-identified patent and that said Letters Patent are hereby corrected as shown below:

Column 4, line 37, after "layer", second occurrence, insert --; separating the two layers; bringing the pH of the aqueous layer --.

Signed and sealed this 9th day of May 1972.

(SEAL)
Attest:

EDWARD M. FLETCHER, JR.
Attesting Officer

ROBERT GOTTSCHALK
Commissioner of Patents